United States Patent
Jo et al.

(10) Patent No.: US 11,239,511 B2
(45) Date of Patent: Feb. 1, 2022

(54) BATTERY MODULE HAVING HEAT DISSIPATION PLATE

(71) Applicant: LG CHEM, LTD., Seoul (KR)

(72) Inventors: Sang-Hyun Jo, Daejeon (KR); Ki-Youn Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 259 days.

(21) Appl. No.: 16/605,907

(22) PCT Filed: Sep. 13, 2018

(86) PCT No.: PCT/KR2018/010775
§ 371 (c)(1),
(2) Date: Oct. 17, 2019

(87) PCT Pub. No.: WO2019/107717
PCT Pub. Date: Jun. 6, 2019

(65) Prior Publication Data
US 2020/0076025 A1 Mar. 5, 2020

(30) Foreign Application Priority Data
Dec. 1, 2017 (KR) .................. 10-2017-0164183

(51) Int. Cl.
*H01M 10/6555* (2014.01)
*H01M 10/6556* (2014.01)
(Continued)

(52) U.S. Cl.
CPC ... *H01M 10/6555* (2015.04); *H01M 10/6556* (2015.04); *H01M 50/20* (2021.01); *H01M 50/531* (2021.01); *H01M 6/46* (2013.01)

(58) Field of Classification Search
CPC combination set(s) only.
See application file for complete search history.

(56) References Cited

U.S. PATENT DOCUMENTS

2011/0020677 A1* 1/2011 Shin .................. H01M 10/658
429/71
2012/0301747 A1 11/2012 Han et al.
(Continued)

FOREIGN PATENT DOCUMENTS

CN 104201434 A 12/2014
EP 2 056 392 A1 5/2009
(Continued)

OTHER PUBLICATIONS

Extended European Search Report issued in European Application No. 18882341.3, dated Oct. 9, 2020.
(Continued)

*Primary Examiner* — Amanda J Barrow
(74) *Attorney, Agent, or Firm* — Birch, Stewart, Kolasch & Birch, LLP

(57) ABSTRACT

A battery module includes a cell assembly having a plurality of secondary batteries and a plurality of heat dissipation plates interposed between the plurality of secondary batteries. At least a portion of a front end and a rear end of the heat dissipation plates is recessed to form an inlet portion and an outlet portion so that a coolant is introduced from the outside or discharged to the outside, and the heat dissipation plates have a coolant moving portion so that the coolant moves to a front end, an upper end, a lower end and a rear end of the secondary batteries. A bus bar assembly has a plurality of bus bars and a bus bar frame having insert holes into which the electrode leads of the secondary batteries are inserted; an end cover having a vent hole communicating with the coolant moving portion and a plurality of side plates.

14 Claims, 10 Drawing Sheets

(51) Int. Cl.
  *H01M 2/10*   (2006.01)
  *H01M 2/26*   (2006.01)
  *H01M 50/20*  (2021.01)
  *H01M 50/531* (2021.01)
  *H01M 6/46*   (2006.01)

(56) References Cited

U.S. PATENT DOCUMENTS

| | | | |
|---|---|---|---|
| 2013/0045410 A1* | 2/2013 | Yang | H01M 10/613 |
| | | | 429/120 |
| 2013/0089763 A1 | 4/2013 | Lee | |
| 2016/0093929 A1 | 3/2016 | Obasih et al. | |
| 2017/0033419 A1 | 2/2017 | Eom et al. | |
| 2017/0125774 A1* | 5/2017 | Choi | H01M 50/543 |
| 2017/0194681 A1 | 7/2017 | Kim et al. | |
| 2018/0159096 A1* | 6/2018 | Kim | H01M 10/0525 |
| 2018/0175464 A1* | 6/2018 | Kim | H01M 50/24 |
| 2019/0148681 A1* | 5/2019 | Park | H01M 10/613 |
| | | | 429/120 |
| 2020/0075267 A1 | 3/2020 | Sawamura et al. | |

FOREIGN PATENT DOCUMENTS

| | | |
|---|---|---|
| JP | 2013-229266 A | 11/2013 |
| KR | 10-2011-0126764 A | 11/2011 |
| KR | 10-2012-0132338 A | 12/2012 |
| KR | 10-2014-0062603 A | 5/2014 |
| KR | 10-2015-0044599 A | 4/2015 |
| KR | 10-2015-0118375 A | 10/2015 |
| KR | 10-2015-0137262 A | 12/2015 |
| KR | 10-2015-0142087 A | 12/2015 |
| KR | 10-2016-0117955 A | 10/2016 |
| KR | 10-2016-0132143 A | 11/2016 |
| WO | WO 2018/097092 A1 | 5/2018 |

OTHER PUBLICATIONS

International Search Report for PCT/KR2018/010775 dated Dec. 20, 2018.

* cited by examiner

BATTERY MODULE HAVING HEAT DISSIPATION PLATE

TECHNICAL FIELD

The present disclosure relates to a battery module including a heat dissipation plate, and more particularly, to a battery module capable of cooling a plurality of secondary batteries accommodated therein more efficiently.

The present application claims priority to Korean Patent Application No. 10-2017-0164183 filed on Dec. 1, 2017 in the Republic of Korea, the disclosures of which are incorporated herein by reference.

BACKGROUND ART

Secondary batteries currently commercialized include nickel cadmium batteries, nickel hydrogen batteries, nickel zinc batteries, lithium secondary batteries and so on. Among them, the lithium secondary batteries are more highlighted in comparison to nickel-based secondary batteries due to advantages such as free charging and discharging, caused by substantially no memory effect, very low self-discharge rate, and high energy density.

A battery pack applied to an electric vehicle or the like has a structure in which a plurality of battery modules, each having a plurality of secondary batteries, are connected to obtain a high output. In addition, each secondary battery includes a positive electrode current collector, a negative electrode current collector, a separator, an active material and an electrolyte as an electrode assembly, and may be repeatedly charged and discharged by an electrochemical reaction between the components.

Meanwhile, as the need for a large-capacity structure has recently increased along with the need for utilization as an energy storage source, there has been an increasing demand for a battery pack with a multi-module structure in which a plurality of battery modules, each having a plurality of secondary batteries connected in series and/or in parallel, are aggregated.

Since the battery pack with a multi-module structure is manufactured such that a plurality of secondary batteries are densely packed in a narrow space, it is important to easily release the heat generated from each secondary battery.

In other words, during the secondary battery charging or discharging process, heat is generated due to the electrochemical reaction. Thus, if the heat of the battery module generated during the charging and discharging process is not effectively removed, heat accumulation may occur. In addition, deterioration of the battery module may be accelerated and, in some cases, ignition or explosion may occur. Accordingly, in the conventional art, a secondary cooling device for cooling the high-capacity large-capacity battery module and the secondary batteries included therein is applied.

For example, in the conventional cooling device, a plurality of secondary batteries mounted inside the battery module and a plurality of cartridges on which the secondary batteries are mounted may be separated by a predetermined distance to separately form a cooling channel through which a coolant flows.

However, if a predetermined distance is secured between the plurality of cartridges inside the battery module, the energy density per volume of the battery module is significantly lowered.

Thus, it is necessary to develop a technology that may provide a battery module with a high energy density while improving the performance of the battery module by effectively cooling the battery module.

DISCLOSURE

Technical Problem

The present disclosure is designed to solve the problems of the related art, and therefore the present disclosure is directed to providing a battery module, which may cool a plurality of secondary batteries accommodated therein more efficiently These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a battery module, comprising:

a cell assembly having a plurality of secondary batteries arranged in a left and right direction and a plurality of heat dissipation plates interposed between the plurality of secondary batteries, wherein at least a portion of a front end and a portion of a rear end of the heat dissipation plates are recessed to form an inlet portion and an outlet portion so that a coolant is introduced from the outside or discharged to the outside, and wherein the heat dissipation plates have a coolant moving portion at which a moving space is formed so that the coolant moves to a front end, an upper end, a lower end and a rear end of the secondary batteries; a bus bar assembly located at a front side or a rear side of the cell assembly and having a plurality of bus bars electrically connected to electrode leads respectively provided at the plurality of secondary batteries and a bus bar frame to which the bus bars are mounted, the bus bar frame having insert holes into which the electrode leads of the secondary batteries are inserted; an end cover coupled to an outer side surface of the bus bar assembly and having a vent hole communicating with the coolant moving portion so that the coolant is introduced from the outside or discharged to the outside; and a plurality of side plates configured to surround left and right side surfaces of the cell assembly, respectively.

Also, the secondary battery may include an electrode assembly in which a positive electrode plate and a negative electrode plate are disposed with a separator being interposed therebetween; and an exterior having an accommodation portion formed to accommodate and seal the electrode assembly along with an electrolyte and disposed to erect so that the accommodation portion is oriented to both sides.

Further, each heat dissipation plate may include a base plate provided to face one side surface of the secondary battery at which accommodation portion is formed; and sidewalls extending from an outer edge of the base plate toward the secondary battery to surround a front end, an upper end, a lower end and a rear end of the secondary battery.

In addition, the coolant moving portion may be formed in a space between the front end, the upper end, the lower end and the rear end of accommodation portion and the sidewalls of the heat dissipation plate.

Further, the sidewalls of the heat dissipation plate may include a front sidewall, a rear sidewall, an upper sidewall and a lower sidewall.

Also, corner portions ridged toward the arrangement of the plurality of secondary batteries may be formed at upper and lower portions of an inner surface of the front sidewall or the rear sidewall.

Moreover, the corner portion may have an inclined surface extending from the front sidewall or the rear sidewall to the upper sidewall or the lower sidewall.

In addition, a coupling protrusion protruding toward another heat dissipation plate may be formed at the corner portion.

Further, an insert groove may be formed at the heat dissipation plate so that a coupling protrusion formed at another heat dissipation plate is inserted therein.

Also, a grip portion extending with a slant from the base plate may be formed at the sidewall of the heat dissipation plate to adhere and support an outer surface of the secondary battery.

Moreover, at least two support protrusions protruding upward or downward may be formed at the grip portion to support and fix an inner surface of the upper sidewall or the lower sidewall of the side plate.

In addition, the electrode leads may be inserted into the insert holes of the bus bar frame and be in contact with the bus bar when an end of each of the electrode lead is bent in a left direction or in a right direction.

Further, a leaf spring may be mounted to an inner side surface of the end cover to press an end of the electrode leads in contact with the bus bar toward the bus bar frame.

Also, at least a portion of a surface of the end cover, which is opposite to the surface to which the leaf spring is mounted, may have a honeycomb structure.

Moreover, a stopper protruding toward the accommodation portion of the secondary battery may be formed at the bus bar frame to prevent the secondary battery from moving forward or rearward.

In addition, the stopper may have a plate shape whose left and right side surfaces are broader than upper and lower surfaces thereof, and a guide protrusion may be formed at a left side surface or a right side surface of the stopper so that the coolant introduced into the insert holes is distributed in an upper and lower direction.

In another aspect of the present disclosure, there is also provided a battery module, comprising:

a cell assembly having a plurality of secondary batteries arranged in a left and right direction and a plurality of heat dissipation plates interposed between the plurality of secondary batteries, wherein the plurality of heat dissipation plates have an inlet portion and an outlet portion recessed so that a coolant is introduced from the outside or discharged to the outside, and the heat dissipation plates have a coolant moving portion at which a moving space is formed so that the coolant moves to a front end, an upper end, a lower end and a rear end of the secondary batteries;

a bus bar assembly located at a front side or a rear side of the cell assembly and having a plurality of bus bars electrically connected to electrode leads respectively provided at the plurality of secondary batteries, a bus bar frame to which the bus bars are mounted, the bus bar frame having insert holes into which the electrode leads of the secondary batteries are inserted, and a sensing circuit board mounted to the bus bar frame and electrically connected to the plurality of bus bars;

an end cover coupled to one surface of the bus bar assembly and having a vent hole communicating with the coolant moving portion so that the coolant is introduced from the outside or discharged to the outside; and a plurality of side plates configured to surround both left and right side surfaces of the cell assembly, respectively.

In another aspect of the present disclosure, there is also provided a battery pack, comprising at least one battery module as above.

In another aspect of the present disclosure, there is also provided a device, comprising the battery pack as above.

Advantageous Effects

According to an embodiment of the present disclosure, the battery module includes a heat dissipation plate having a coolant moving portion formed at the inside thereof that accommodates the secondary batteries, and thus the secondary batteries accommodated inside the battery module may be effectively cooled even though a separate space for moving the coolant is not separately formed inside the cell assembly.

Further, according to the embodiment of the present disclosure, both side surfaces of the base plate formed at the heat dissipation plate are configured to face the accommodation portions of two secondary batteries. Thus, the heat generated from the secondary batteries of the cell assembly may be conducted to the heat dissipation plate efficiently, and the conducted heat may be dissipated to the open top or bottom of the heat dissipation plate, thereby securing an excellent cooling effect.

Also, according to the embodiment of the present disclosure, the coolant may be induced to move from the front end of the secondary battery to the upper end or the lower end thereof by using the inclined surface of the corner portion of the heat dissipation plate. Thus, the deterioration of the cooling effect due to coolant stagnation is small, and the cooling efficiency of the battery module may be improved.

Further, according to the embodiment of the present disclosure, since the leaf spring mounted to the end cover presses and fixes the outer surface of the electrode lead in contact with the bus bar, the welding process between the electrode lead and the bus bar may be omitted, thereby simplifying the manufacturing process and thus reducing the manufacturing cost.

In addition, according to the embodiment of the present disclosure, since the stopper formed at the bus bar frame effectively prevents the plurality of secondary batteries located inside the battery module from moving forward or rearward, it is possible to effective prevent that the connection structure of the electrode lead and the bus bar of the secondary battery is broken or the internal configuration of the secondary battery is damaged.

Moreover, according to the embodiment of the present disclosure, since the guide protrusion formed at the stopper may effectively guide the coolant introduced into the battery module to the coolant moving portion, the coolant may move smoothly without stagnation, thereby effectively cooling the battery module.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
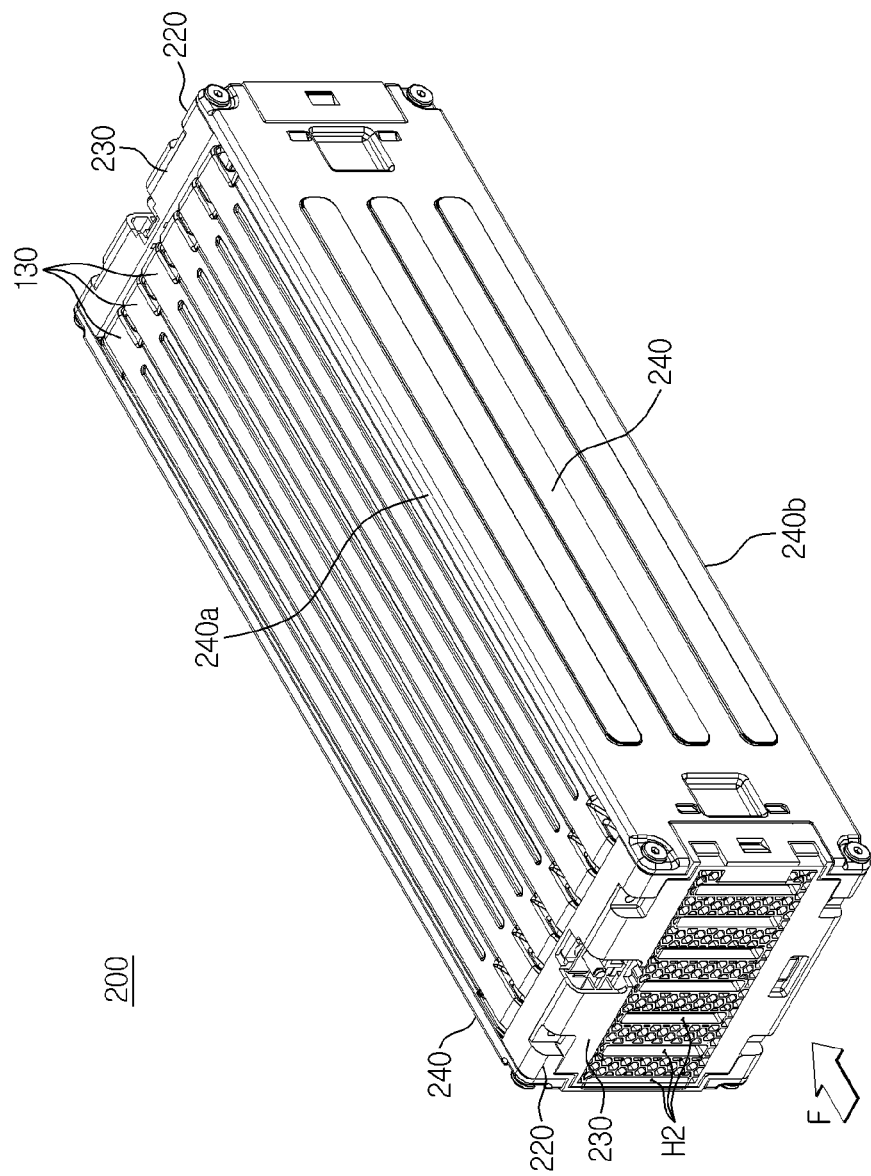
FIG. 1 is a perspective view schematically showing a battery module according to an embodiment of the present disclosure.
Figure 2:
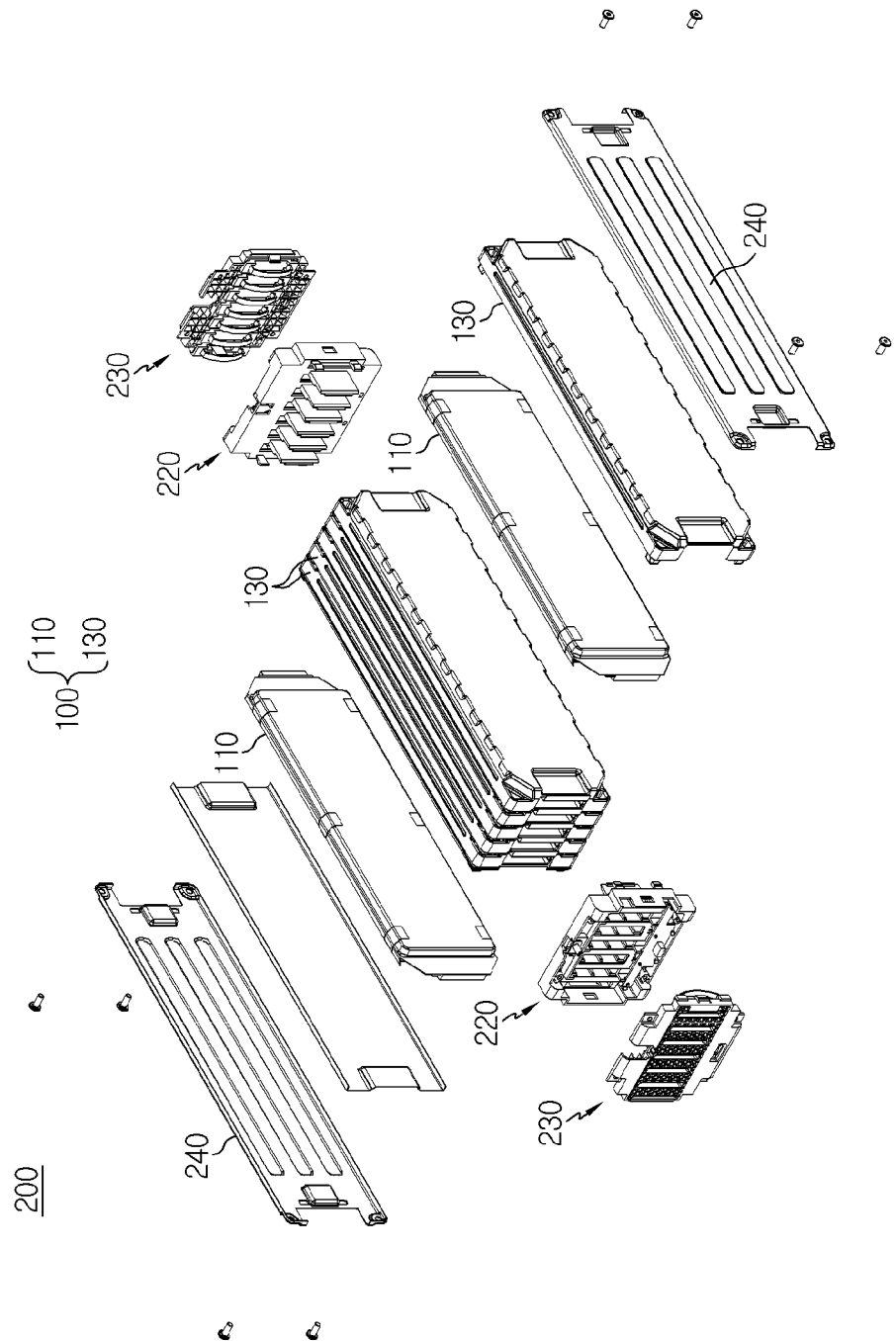
FIG. 2 is an exploded perspective view schematically showing components of the battery module according to an embodiment of the present disclosure.

FIG. 1 is a perspective view schematically showing a battery module according to an embodiment of the present disclosure. FIG. 2 is an exploded perspective view schematically showing components of the battery module according to an embodiment of the present disclosure. In addition, FIG. 3 is a perspective view schematically showing a secondary battery, employed at the battery module according to an embodiment of the present disclosure.

Figure 3:
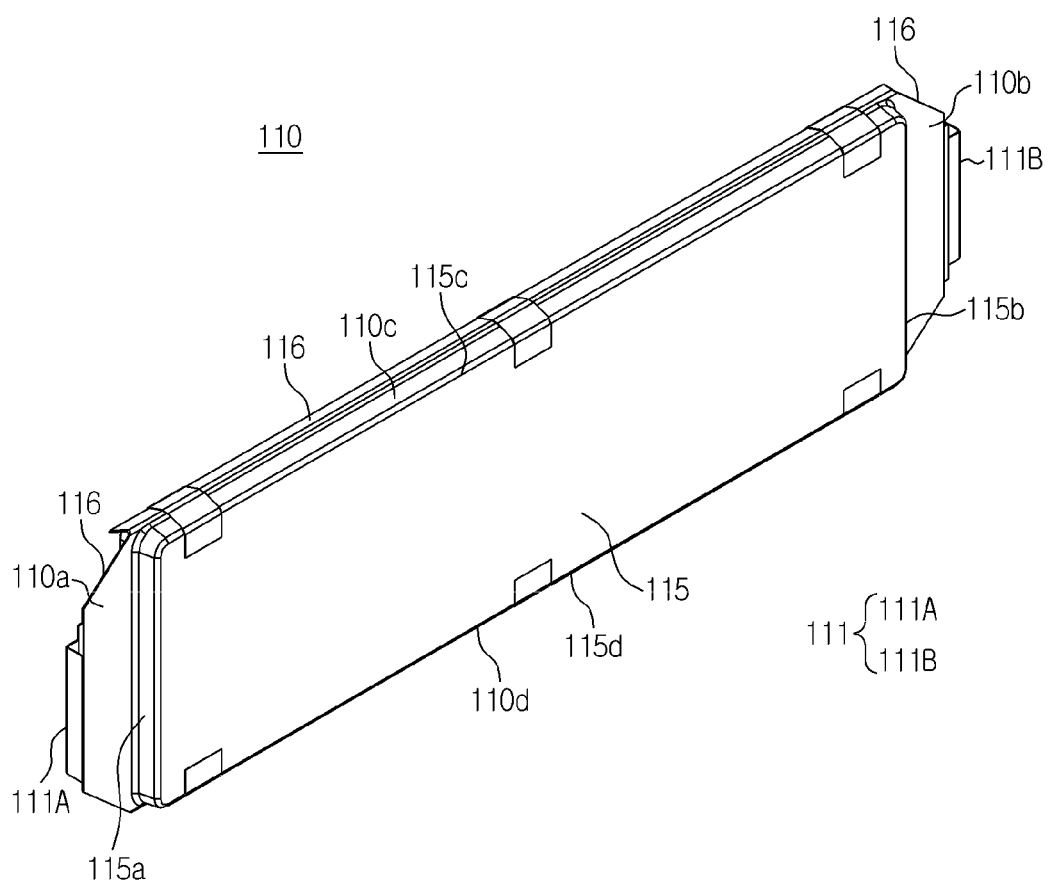
FIG. 3 is a perspective view schematically showing a secondary battery, employed at the battery module according to an embodiment of the present disclosure.

Referring to FIGS. 1 to 3, a battery module 200 according to an embodiment of the present disclosure may include a cell assembly 100, a bus bar assembly 220, an end cover 230 and a side plate 240.

Here, the cell assembly 100 may include a plurality of secondary batteries 110 arranged in a left and right direction.

Here, the secondary battery 110 may be a pouch-type secondary battery 110. In particular, the pouch-type secondary battery 110 may include an electrode assembly, an electrolyte and a pouch.

Here, the pouch may include two pouches, namely a left pouch and a right pouch, each having an accommodation portion 115 formed therein with a concave shape. In addition, each pouch includes an outer insulating layer, a metal layer and an inner adhesive layer, and a sealing portion 116 may be formed by fusing inner adhesive layers at an edge portion of the pouch. Also, the accommodation assembly 115 may accommodate and seal the electrode assembly and the electrolyte. Further, the secondary battery 110 may be disposed such that the accommodation portion 115 of the cell assembly 100 faces both sides in the left and right direction.

In addition, the electrode assembly is an assembly of an electrode and a separator, and at least one positive electrode plate and at least one negative electrode plate may disposed with a separator interposed therebetween. A first electrode plate of the electrode assembly includes a first electrode tab, and at least one first electrode tab may be connected to the first electrode lead 111A. Here, one end of the first electrode lead 111A is connected to the first electrode tab and the other end thereof is exposed out of the pouch. The exposed portion may function as an electrode terminal of the secondary battery 110, for example a positive electrode terminal of the secondary battery 110.

In addition, a second electrode plate of the electrode assembly includes a second electrode tab, and at least one second electrode tab may be connected to the second electrode lead 111B. Also, one end of the second electrode lead 111B is connected to the second electrode tab and the other end thereof is exposed out of the pouch. The exposed portion may serve as an electrode terminal of the secondary battery 110, for example a negative electrode terminal of the secondary battery 110.

At this time, the first electrode tab and the second electrode tab of the secondary battery 110 may be a positive electrode tab or a negative electrode tab, and the first electrode lead 111A and the second electrode lead 111B may be a positive electrode lead or a negative electrode lead. Further, the first electrode lead 111A and the second electrode lead 111B may be electrode leads 111 of different polarities. For example, the first electrode lead 111A may be a positive electrode lead and the second electrode lead 111B may be a negative electrode lead.

Further, the positive electrode lead and the negative electrode lead may be formed at opposite sides based on the center of the secondary battery 100. For example, as shown in FIG. 3, each secondary battery 110 may be respectively configured so that the first electrode lead 111A and the second electrode lead 111B protrude forward and backward, respectively.

Thus, according to this configuration of the present disclosure, in one secondary battery 110, there is no interference between the positive electrode lead 111 and the negative electrode lead 112, and thus it is possible to broaden the area of the electrode lead 111. In addition, the welding process between the electrode leads 111 and the welding process between the electrode lead 111 and the bus bar 221 may be performed more easily.

Also, the first electrode lead 111A and second negative electrode lead 111B may be configured to have a plate form. In particular, the first electrode lead 111A and the second electrode lead 111B may protrude horizontally in a standing state so that their broad surfaces face left and right, and the end of the electrode lead 111 may be bent to the right or left.

In addition, the secondary battery 110 may be provided in plural in the battery module 200, and the plurality of secondary batteries 110 may be arranged in at least one direction. For example, as shown in FIG. 2, a plurality of pouch-type secondary batteries 110 may be stacked one on another in parallel in the right and left direction. At this time, each pouch-type secondary battery 110 may be disposed to stand approximately perpendicular to the ground so that two broad surfaces positioned are respectively located at left and right and the sealing portions 116 are located at upper, lower, front and rear portions, when viewed in the direction F (shown in FIG. 1).

In other words, each secondary battery 110 may be configured in a vertically standing form. Meanwhile, in this specification, the upper, lower, front, rear, right and left directions are set based on the direction F (shown in FIG. 1), unless otherwise specified.

The configuration of the pouch-type secondary battery 110 described above is obvious to those skilled in the art and thus will not be described in detail here. In addition, the battery module 200 according to the present disclosure may employ various kinds of secondary batteries 110 known at the time of filing of this application.

Figure 4:
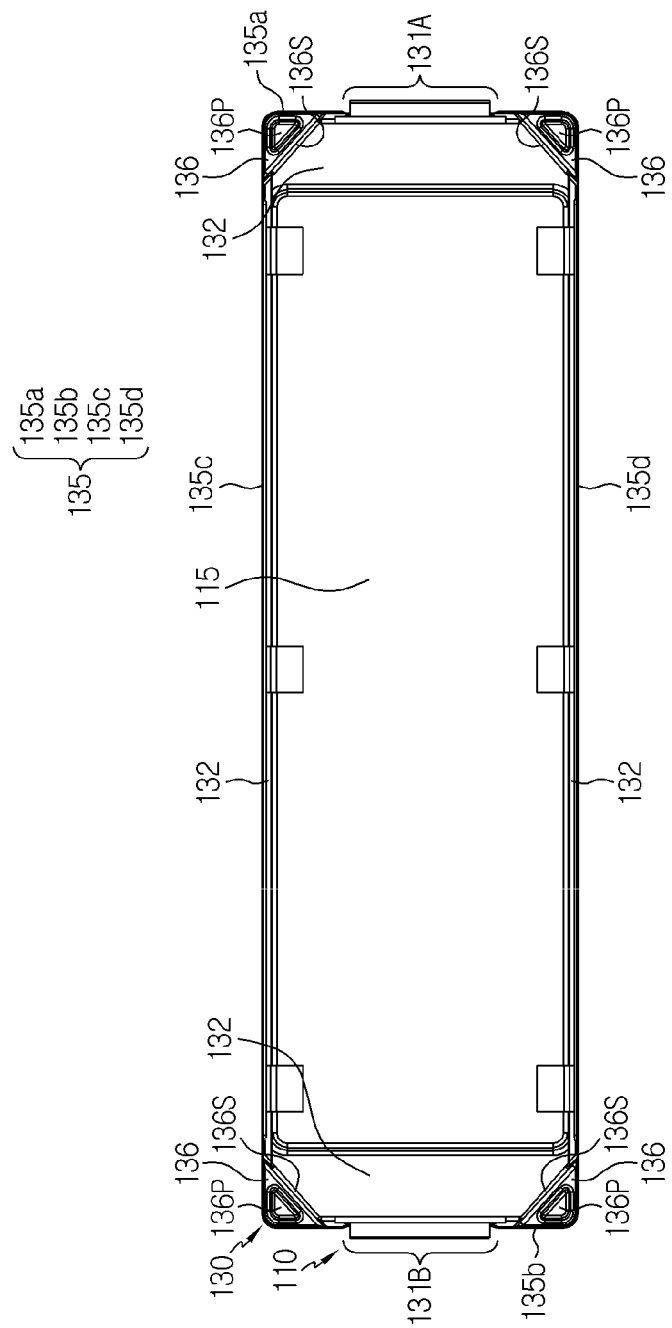
FIG. 4 is a side view schematically showing a secondary battery and a heat dissipation plate, employed at the battery module according to an embodiment of the present disclosure.
Figure 5:
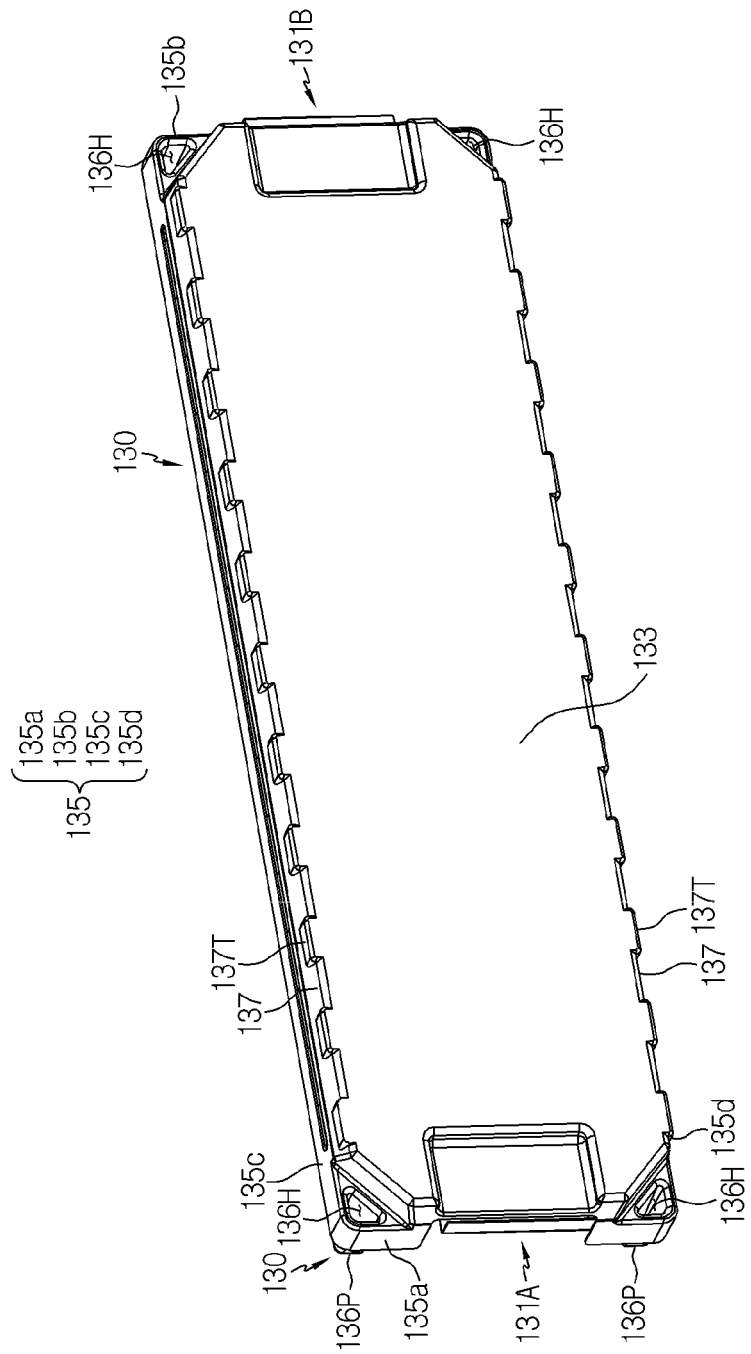
FIG. 5 is a perspective view schematically showing the secondary battery and the heat dissipation plate, employed at the battery module according to an embodiment of the present disclosure.

FIG. 4 is a side view schematically showing a secondary battery and a heat dissipation plate, employed at the battery module according to an embodiment of the present disclosure. FIG. 5 is a perspective view schematically showing the secondary battery and the heat dissipation plate, employed at the battery module according to an embodiment of the present disclosure.

Referring to FIGS. 4 and 5 along with FIG. 3, the cell assembly 100 may further include a plurality of heat dissipation plates 130.

Here, the heat dissipation plate 130 may be interposed between the plurality of secondary batteries 110. Also, the heat dissipation plate 130 may accommodate at least a portion of the secondary battery 110 therein. Further, the secondary battery 110 may be adhered to at least one of left and right side surfaces of the heat dissipation plate 130.

For example, as shown in FIG. 2, six heat dissipation plates 130 may be interposed between seven secondary batteries 110. In addition, the side plate 240 may be positioned at each of the left and right sides of the cell assembly 100.

In addition, the heat dissipation plate 130 may have an inlet portion 131A and an outlet portion 131B so that a coolant may be introduced from the outside or discharged to the outside. Specifically, a front end of the heat dissipation plate 130 may be partially recessed in the right direction in comparison to the remaining portion to form the inlet portion 131A. Also, a rear end of the heat dissipation plate 130 may be partially recessed in the right direction in comparison to the remaining portion to form the outlet portion 131B.

That is, at the heat dissipation plate 130, the coolant may be introduced from the outside through the inlet portion 131A formed at the front end, and the introduced coolant may be discharged to the outside through the outlet portion 131B formed at the rear end.

Further, the heat dissipation plate 130 may include a coolant moving portion 132 having a moving space such that the coolant moves to a front end 110a, an upper end 110c, a lower end 110d and a rear end 110b of the secondary battery 110 and contacts the secondary battery 110.

That is, the coolant moving portion 132 may have a structure in which the heat dissipation plate 130 is spaced apart from the front end 110a, the upper end 110c, the lower end 110d and the rear end 110b of the secondary battery 110 by a predetermined distance. In addition, at the coolant moving portion 132, the coolant introduced through the inlet portion 131A may be discharged to the outside through the outlet portion 131B, via the front end 110a, the upper end 110c and the rear end 110b of the secondary battery 110 in order. Further, at the coolant moving portion 132, the coolant introduced through the inlet portion 131A may be discharged to the outside through the outlet portion 131B, via the front end 110a, the lower end 110d and the rear end 110b of the secondary battery 110 in order.

Thus, according to this configuration of the present disclosure, the heat dissipation plate 130 forms the coolant moving portion 132 at the inside accommodating the secondary battery 110, and thus it is possible to effectively cool the secondary battery 110 even though a separate space for moving the coolant is not formed inside the cell assembly 100.

Further, though the coolant is conventionally in contact with only the heat dissipation plate 130, in the present disclosure, the coolant flows through the front end 110a, the upper end 110c, the lower end 110d and the rear end 110b of the secondary battery 110, which directly cool the secondary battery 110, thereby maximizing the cooling rate and efficiency.

Figure 6:
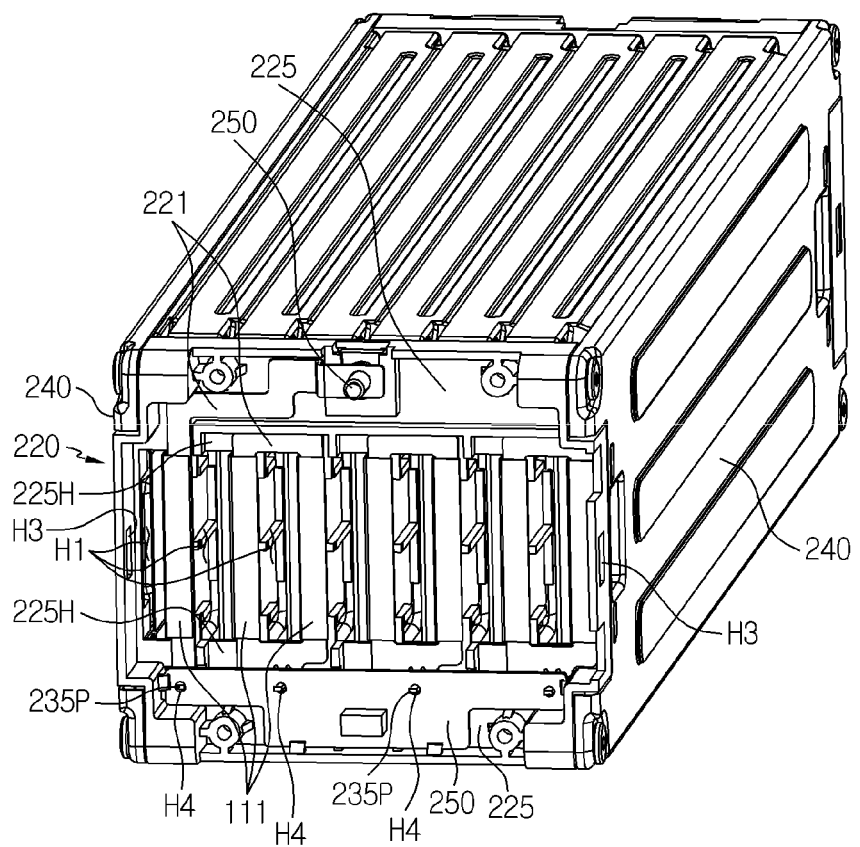
FIG. 6 is a perspective view schematically showing some components of the battery module according to an embodiment of the present disclosure.

FIG. 6 is a perspective view schematically showing some components of the battery module according to an embodiment of the present disclosure.

Referring to FIG. 6 along with FIG. 2, the bus bar assembly 220 may be located at a front side or a rear side of the cell assembly 100. In addition, the bus bar assembly 220 may include a plurality of bus bars 221 electrically connected to the electrode leads 111 of the plurality of secondary batteries 110, respectively.

Here, the bus bar 221 may be made of an electrically conductive material with a relatively high electrical conductivity. Thus, the bus bar 221 configured as above may contact at least one of the first electrode lead 111A and the second electrode lead 111B of the plurality of secondary batteries 110 to electrically connect the secondary batteries 110 to each other.

For example, the bus bar 221 may contact a plurality of electrode leads 111 of the same polarity or a plurality of electrode leads 111 of different polarities to electrically connect the plurality of secondary batteries 110.

Moreover, the bus bar 221 may have a metal plate shape. Specifically, the metal plate shape may have a bar shape elongated in one direction. In addition, the metal may be an alloy including, for example, copper, aluminum, nickel, or the like. Further, the bar shape of the bus bar 221 may be bent at least once. In addition, the bus bar 221 may have a rectangular frame shape.

Also, one end of the bus bar 221 may be electrically connected to the sensing circuit board 250. Further, the sensing circuit board 250 may include a measuring element for measuring voltage, current or the like of the plurality of secondary batteries 110.

Further, the bus bar assembly 220 may further include a bus bar frame 225. Here, the bus bar frame 225 may have an electrically insulating material. For example, the bus bar frame 225 may have a plastic material such as polyvinyl chloride.

In addition, the bus bar 221 may be mounted to an outer side surface of the bus bar frame 225. Also, the bus bar 221 may be fixed to the bus bar frame 225 by means of a fastening bolt. Alternatively, a fitting groove 225H is formed in the outer side surface of the bus bar frame 225 so that the bus bar 221 is inserted and fixed therein.

Also, referring to FIG. 6 along with FIG. 3, an insert hole H1 for inserting the electrode lead 111 of the secondary battery 110 may be formed in the bus bar frame 225. Further, the electrode lead 111 may be inserted into the insert hole H1 to protrude forward or backward, and the end of the electrode lead 111 may be bent to the left or right direction to contact the outer side surface of the bus bar 221.

In addition, the insert hole H1 may serve as a passage through which the coolant introduced from the outside may move to the inlet portion 131A of the heat dissipation plate 130. Also, the insert hole H1 of the bus bar assembly 220 close to the outlet portion 131B of the heat dissipation plate 130 may be used as a passage through which the coolant discharged from the outlet portion 131B flows to the outside.

Referring to FIG. 2 again, the end cover 230 may be coupled to the outer side surface of the bus bar assembly 220. Specifically, the end cover 230 located at the front side of the battery module 200 may be coupled to the front surface of the bus bar assembly 220 located at the front side, and the end cover 230 located at the rear side of the battery module 200 may be coupled to the rear surface of the bus bar assembly 220 located at the rear side. At this time, the coupling method may be bolt coupling and/or hook coupling.

Referring to FIGS. 1, 2 and 6 again, a vent hole H2 may be formed in the end cover 230 so that the coolant may be introduced into the battery module 200 from the outside or be discharged to the outside from the inside of the battery module 200.

Specifically, the vent hole H2 may communicate with the insert hole H1 formed in the bus bar frame 225 of the bus bar assembly 220 that is coupled with the end cover 230. That is, since the insert hole H1 of the bus bar frame 225 communicates with the inlet portion 131A or the outlet portion 131B of the heat dissipation plate 130, the vent hole H2 of the end cover 230 may be connected to the inlet portion 131A of the heat dissipation plate 130 so that the coolant may flow to the coolant moving portion 132 formed in the heat dissipation plate 130.

Further, the side plate 240 may be provided in plural. The plurality of side plates 240 may be configured to surround both left and right side surfaces of the cell assembly 100.

Specifically, the side plate 240 may serve as an exterior in the battery module 200. Accordingly, the side plate 240 gives structural stability to the battery module 200 and protects components accommodated therein, such as the cell assembly 100, from other external physical factors such as impacts and substances.

For this, the side plate 240 may be made of a metal material such as stainless steel, steel or aluminum.

In particular, if the side plate 240 is made of a metal material such as aluminum, the heat generated in the cell assembly 100 may be effectively emitted out of the side plate 240 by means of the high thermal conductivity of aluminum.

For example, as shown in FIG. 2, the battery module 200 of the present disclosure may have two side plates 240, which are disposed to surround both left and right side surfaces of the cell assembly 100, respectively.

Referring to FIG. 4 along with FIG. 2 again, the heat dissipation plate 130 may include a base plate 133 and a sidewall 135 extending from the base plate 133. Specifically, the base plate 133 may be configured to face one side surface of the secondary battery 110 at which the accommodation portion 115 is formed.

That is, the base plate 133 may be disposed in an erecting manner to face the left and right side surfaces of the secondary battery 110. For example, as shown in FIGS. 2 and 4, the left side surface of the base plate 133 may be configured to face the accommodation portion 115 of the secondary battery 110 accommodated in the heat dissipation plate 130. In addition, the right side surface of the base plate 133 may be configured to face an accommodation portion 115 of another secondary battery 110 adjacent thereto.

Thus, according to this configuration of the present disclosure, both side surfaces of the base plate 133 formed at the heat dissipation plate 130 are configured to face the accommodation portion 115 of two secondary batteries 110, so that the heat generated from the secondary batteries 110 of the cell assembly 100 may be conducted to the heat dissipation plate 130 with a high conductivity. In addition, the conducted heat may be emitted to the open top or bottom of the heat dissipation plate 130. Accordingly, the heat dissipation plate 130 may improve the cooling effect of the cell assembly 100.

In addition, the sidewall 135 of the heat dissipation plate 130 may extend toward the secondary battery 110 to surround the front end 110*a*, the upper end 110*c*, the lower end 110*d* and the rear end 110*b* of the secondary battery 110, at an outer edge of the base plate 133. Further, the sidewall 135 may have a space formed in at least a portion thereof to be spaced from the front end 115*a*, the upper end 115*c*, the lower end 115*d* and the rear end 115*b* of the accommodation portion 115 of the secondary battery 110 by a predetermined distance. For example, the extended end of the sidewall 135 may be spaced apart from the accommodation portion 115 of the secondary battery 110.

Moreover, the coolant moving portion 132 may be formed as a spacing between the front end 115*a*, the upper end 115*c*, the lower end 115*d* and the rear end 115*b* of the accommodation portion 115 and the sidewall 135 of the heat dissipation plate 130. In other words, the coolant moving portion 132 may have a moving space through which the coolant moves to the front end 115*a*, the upper end 115*c* and the rear end 115*b* of the accommodation portion 115 in order or moves to the front end 115*a*, the lower end 115*d* and the rear end 115*b* of the accommodation portion 115 in order.

Further, as shown in FIG. 4, the sidewall 135 of the heat dissipation plate 130 may include a front sidewall 135*a*, a rear sidewall 135*b*, an upper sidewall 135*c* and a lower sidewall 135*d*. In addition, the front sidewall 135*a*, the rear sidewall 135*b*, the upper sidewall 135*c* and the lower sidewall 135*d* are spaced apart from the front end 115*a*, the lower end 115*d* and the rear end 115*b* of the accommodation portion 115 by a predetermined distance to form the coolant moving portion 132.

Thus, according to this configuration of the present disclosure, since the heat dissipation plate 130 forms the coolant moving portion 132 for the coolant to move around the outer edge of the accommodation portion 115 of the secondary battery 110, it is possible to directly cool the accommodation portion 115 of the secondary battery 110 at which heat is intensively generated, and the coolant may move without receiving a large resistance. Accordingly, the battery module 200 may be cooled effectively.

Further, corner portions 136 ridged toward the arrangement of the plurality of secondary batteries 110 may be formed at an upper portion and a lower portion of the inner surface of the front sidewall 135*a* or the rear sidewall 135*b* of the heat dissipation plate 130. Specifically, the corner portions 136 may be formed at the front end and the rear end of the inner surface of the heat dissipation plate 130, respectively. In addition, if the heat dissipation plate 130 has a rectangular shape as viewed from the side, the corner portion 136 may be formed at each corner of the rectangle.

For example, as shown in FIG. 4, at the corner between the front sidewall 135a and the upper sidewall 135c of the heat dissipation plate 130, a portion of the inner surface of the base plate 133 may be ridged toward the arrangement of the plurality of secondary batteries 110 (in the left and right direction) to form the corner portion 136.

In addition, the corner portion 136 may have an inclined surface 136S extending from the front sidewall 135a or the rear sidewall 135b to the upper sidewall 135c or lower sidewall 135d. Specifically, the corner portion 136 may have the inclined surface 136S to guide the coolant to move from the front end 110a of the secondary battery 110 to the upper end 110c or the lower end 110d.

For example, as shown in FIG. 4, the corner portion 136 formed at the upper portion of the front sidewall 135a of the heat dissipation plate 130 may have an inclined surface 136S extending from the front sidewall 135a to the upper sidewall 135c. Also, the corner portion 136 formed at the lower portion of the front sidewall 135a of the heat dissipation plate 130 may have an inclined surface 136S extending from the front sidewall 135a to the lower sidewall 135d.

Further, the corner portion 136 formed at the upper portion of the rear sidewall 135b of the heat dissipation plate 130 may have an inclined surface 136S extending from the rear sidewall 135b to the upper sidewall 135c. Also, the corner portion 136 formed at the lower portion of the rear sidewall 135b of the heat dissipation plate 130 may have an inclined surface 136S extending from the rear sidewall 135b to the lower sidewall 135d.

Thus, according to this configuration of the present disclosure, since the corner portion 136 has the inclined surface 136S, it is possible to guide the coolant to move from the front end 110a of the secondary battery 110 to the upper end 110c or the lower end 110d, thereby allowing the coolant to move in an intended direction without great resistance. Accordingly, in the present disclosure, the degradation of the cooling effect caused by coolant stagnation may be lowered, and the cooling efficiency of the battery module 200 may be improved.

Figure 7:
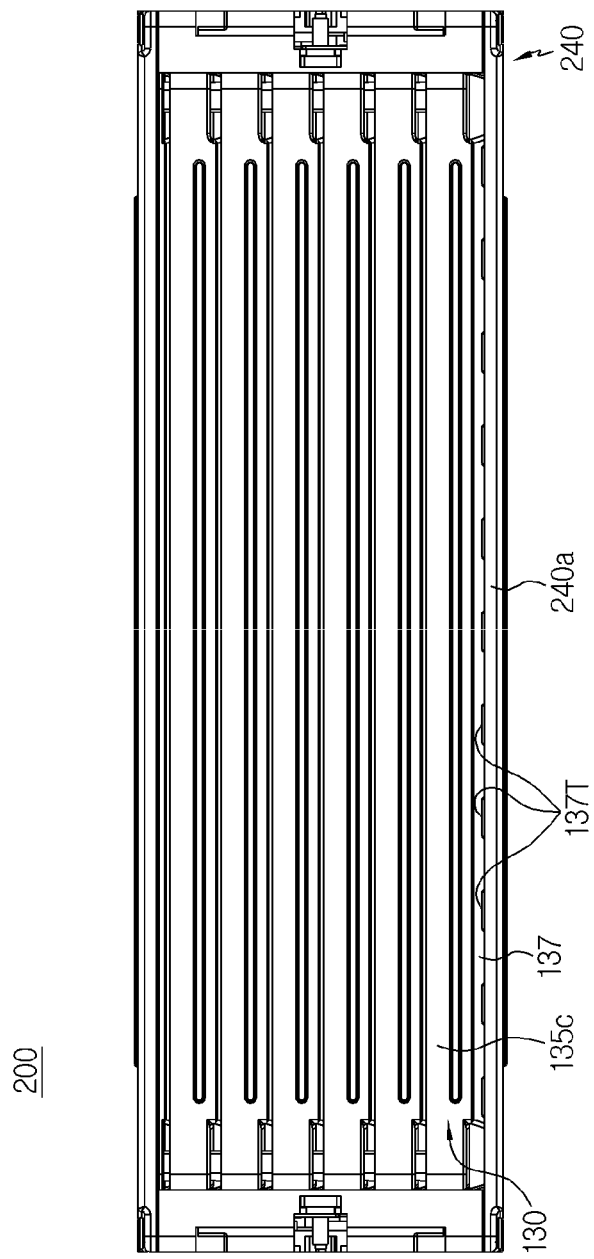
FIG. 7 is a plane view schematically showing the battery module according to an embodiment of the present disclosure.

In addition, FIG. 7 is a plane view schematically showing the battery module according to an embodiment of the present disclosure.

Referring to FIGS. 5 and 7 along with FIG. 4, a coupling protrusion 136P protruding toward another heat dissipation plate 130 may be formed at the corner portion 136. In addition, the coupling protrusion 136P may be formed by protruding at least a portion of the ridged upper surface of the corner portion 136. For example, as shown in FIG. 4, at the left side surface of the heat dissipation plate 130, four coupling protrusions 136P may be formed to protrude from the corner portions 136, respectively.

Further, an insert groove 136H may be formed at the heat dissipation plate 130 such that the coupling protrusion 136P formed at another heat dissipation plate 130 is inserted therein. That is, the insert groove 136H may have an inner shape into which the coupling protrusion 136P may be inserted and fixed.

For example, as shown in FIG. 5, four insert grooves 136H may be formed at the right side surface of the heat dissipation plate 130. In addition, as shown in FIGS. 1 and 2, the six heat dissipation plates 130 may be arranged to be stacked in such a way that the coupling protrusion 136P is inserted into the insert groove 136H.

Thus, according to this configuration of the present disclosure, the plurality of heat dissipation plates 130 are fastened with each other using the coupling protrusion 136P and the insert groove 136H to have an even arrangement easily, thereby improving the manufacturing efficiency of the battery module 200.

In addition, the sidewall 135 of the heat dissipation plate 130 may have a grip portion 137 so that at least a portion of the sidewall 135 closely adheres and supports the outer surface of the secondary battery 110. Further, the grip portion 137 may be formed by convexly extending a portion of the sidewall 135 outwardly with a slant from the base plate 133.

For example, as shown in FIG. 5, the grip portion 137 may be formed at the front sidewall 135a, the upper sidewall 135c, the lower sidewall 135d and the rear sidewall 135b of the heat dissipation plate 130 to extend outward with a slant from the base plate 133.

Thus, according to this configuration of the present disclosure, the heat dissipation plate 130 stably accommodates the accommodation portion of the secondary battery 110 closely by means of the inner surface of the grip portion 137, and the contact area between the heat dissipation plate 130 and the secondary battery 110 is increased, thereby improving the cooling effect of the secondary battery 110.

In addition, the grip portion 137 may have at least two support protrusions 137T protruding upward or downward. Specifically, the support protrusion 137T is formed to be ridged to support and fix the inner surface of the upper sidewall 240a (FIG. 1) or the lower sidewall 240b (FIG. 1) of the side plate 240 mounted on the outer surface of the heat dissipation plate 130.

That is, if the inner surface of the upper sidewall 240a or the lower sidewall 240b of the side plate 240 has a horizontal surface, the support protrusion 137T may be formed to be ridged upward or downward so as to have a horizontal outer surface from the grip portion 137.

For example, referring to FIG. 5, eleven support protrusions 137T may be formed to be ridged upward from the grip portion 137 at the outer surface of the upper sidewall 240a of the heat dissipation plate 130, and eleven support protrusions 137T may be formed to be ridged downward from the grip portion 137 at the outer surface of the lower sidewall 240b of the heat dissipation plate 130.

Thus, according to this configuration of the present disclosure, the support protrusion 137T formed at the grip portion 137 allows the side plate 240 coupled with the heat dissipation plate 130 to be easily mounted and fixed, thereby improving manufacturing efficiency.

Figure 8:
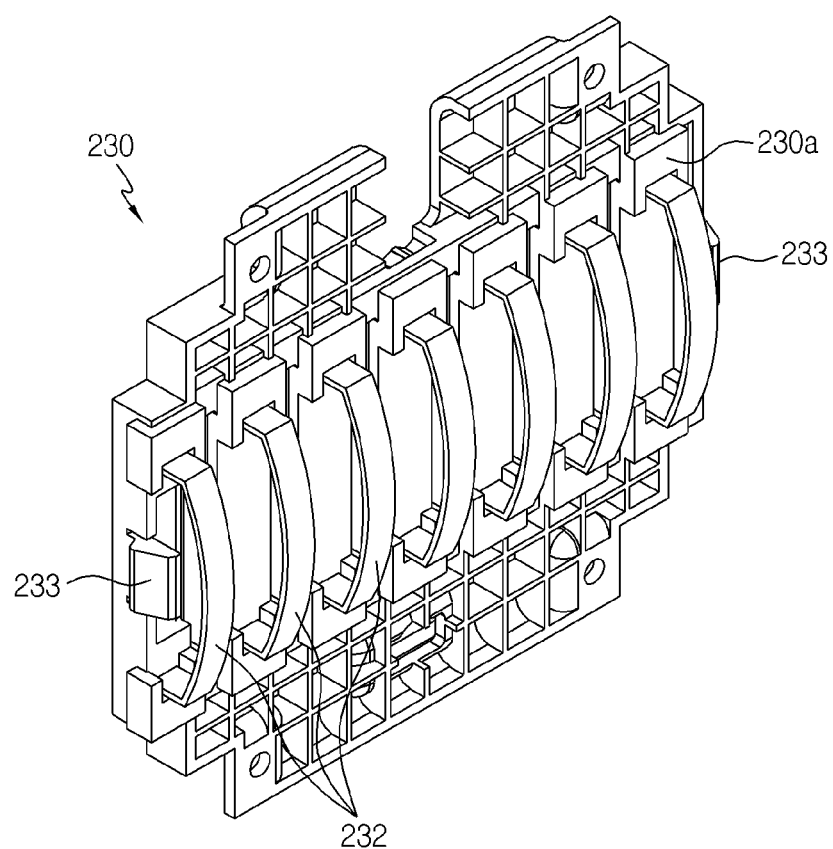
FIG. 8 is a perspective rear view schematically showing an end cover, employed at the battery module according to an embodiment of the present disclosure.

FIG. 8 is a perspective rear view schematically showing an end cover, employed at the battery module according to an embodiment of the present disclosure. In addition, FIG. 9 is a front view schematically showing the end cover, employed at the battery module according to an embodiment of the present disclosure.

Figure 9:
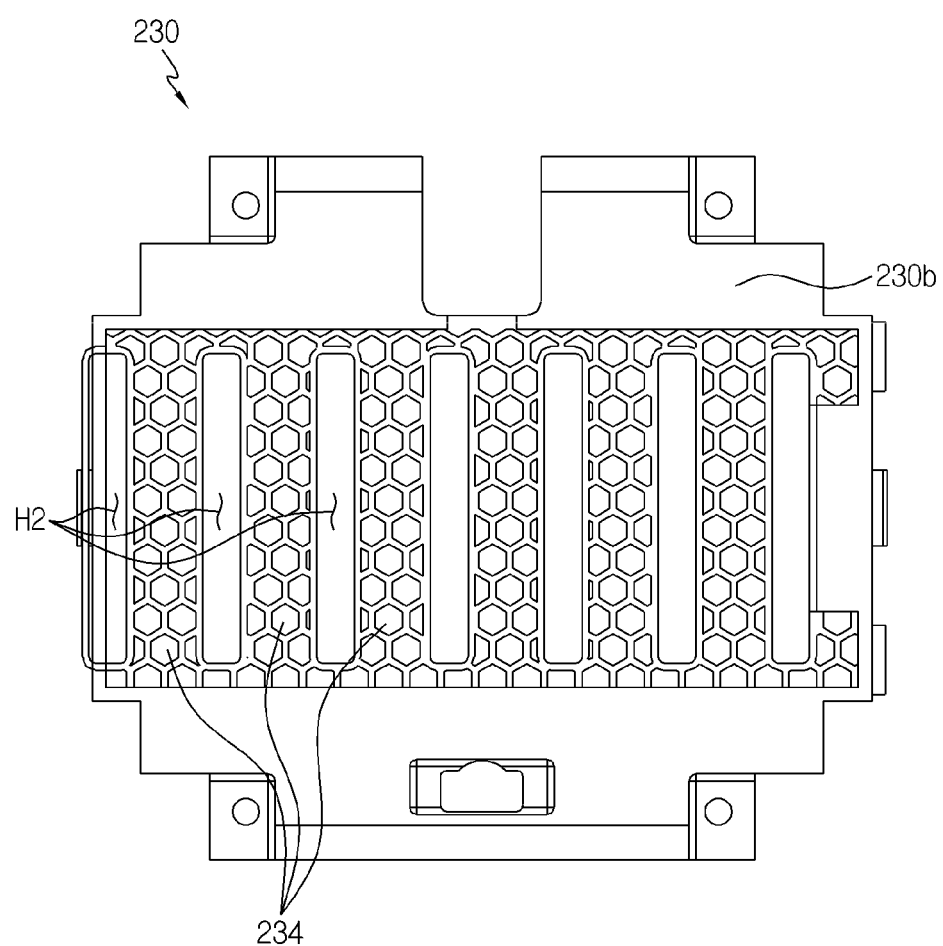
FIG. 9 is a front view schematically showing the end cover, employed at the battery module according to an embodiment of the present disclosure.

Referring to FIGS. 8 and 9 along with FIG. 6, a leaf spring 232 may be mounted to an inner side surface 230a of the end cover 230. Specifically, the leaf spring 232 may be positioned to press an end of the electrode lead 111 in contact with the bus bar 221 toward the bus bar 221.

In addition, the leaf spring 232 may have a plate shape extending in a vertical direction. In addition, an upper end and a lower end of the plate-shaped leaf spring 232 may be inserted and fixed in the end cover 230. Further, a central portion of the leaf spring 232 may have a curved shape bent in the front and rear direction to have elasticity capable of giving a pressing force in the front and rear direction.

For example, as shown in FIG. 8, seven leaf springs 232 may be mounted to the inner side surface 230a of the end cover 230. In addition, each of the seven leaf springs 232 may press and fix the outer surface of the electrode lead 111 in contact with the bus bar 221.

Thus, according to this configuration of the present disclosure, the welding process for electrically connecting the electrode lead 111 and the bus bar 221 may be omitted, and a reliable connection state may be maintained just by simply fastening the end cover 230 to the bus bar assembly 220. Accordingly, in the present disclosure, the manufacturing process of the battery module 200 is simplified, thereby reducing the manufacturing cost.

In addition, hook structures 233 for coupling with the bus bar assembly 220 may be formed at both left and right side ends of the end cover 230. Also, as shown in FIG. 6, coupling holes H3 may be formed at both left and right side portions of the bus bar frame 225 so that the hook structure 233 of the end cover 230 may be fastened thereto.

Thus, according to this configuration of the present disclosure, since the end cover 230 may be fastened to the bus bar frame 225 just by pressing the end cover 230 inward on the bus bar assembly 220, the assembling process may be performed simply and fast.

In addition, the end cover 230 may be formed so that at least a portion of the outer side surface 230b has a honeycomb structure 234. Specifically, the honeycomb structure 234 may be formed on a surface opposite to the surface to which the leaf spring 232 is mounted. That is, while the end cover 230 is being coupled to the bus bar assembly 220, a collision may occur between the leaf spring 232 and the bus bar 221, and at this time, the collision force may be transmitted to the end cover 230 to damage the end cover 230.

For this, in the present disclosure, the honeycomb structure 234 is formed at the opposite surface 230b (the outer side surface) of the inner side surface 230a of the end cover 230 to which the leaf spring 232 is mounted, and thus it is possible to effectively prevent the end cover 230 from being damaged due to the fastening process of the end cover 230 or due to the collision with an external object.

Figure 10:
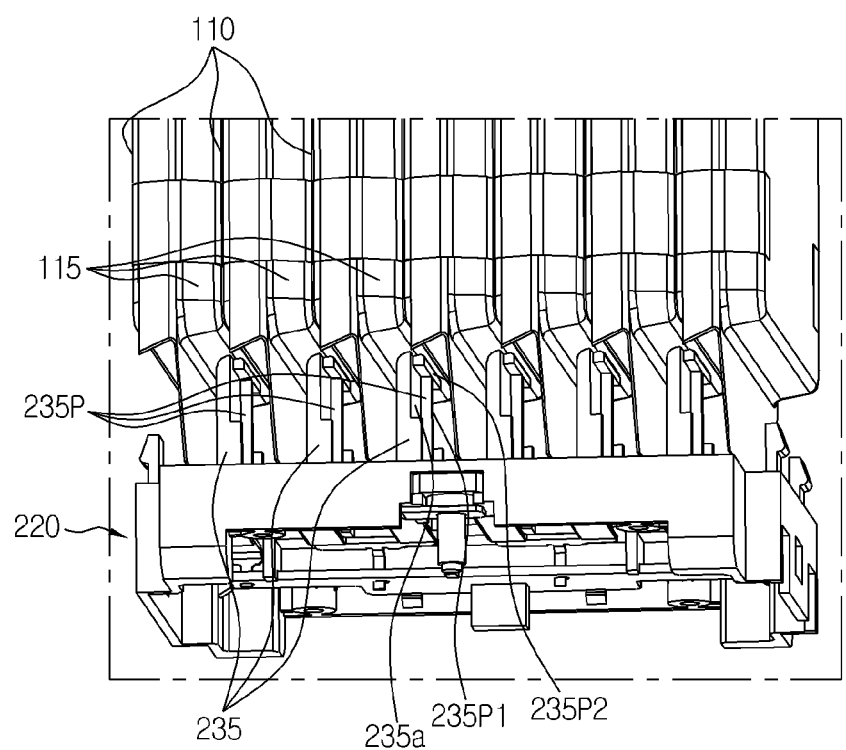
FIG. 10 is a plane view schematically showing some components of the battery module according to an embodiment of the present disclosure.

FIG. 10 is a plane view schematically showing some components of the battery module according to an embodiment of the present disclosure.

Referring to FIG. 10, a stopper 235 protruding toward the accommodation portion 115 of the secondary battery 110 may be formed at the bus bar frame 225 (FIG. 6) of the bus bar assembly 220. Moreover, the stopper 235 may be protruded to prevent the secondary battery 110 from moving forward or backward. In addition, a protruding end of the stopper 235 may be positioned to face the front end or the rear end of the accommodation portion 115 of the secondary battery 110.

For example, as shown in FIG. 10, six stoppers 235 may be formed at the inner side surface of the bus bar frame of the bus bar assembly 220, and the six stoppers 235 may be arranged to face the accommodation portion 115 of the secondary battery 110, respectively.

Thus, according to this configuration of the present disclosure, the stopper 235 effectively prevents the plurality of secondary batteries 110 located inside the battery module 200 from moving forward or rearward since a forward or rearward force is suddenly applied to the battery module 200 due to an external force, and thus it is possible to effectively prevent the connection structure between the electrode lead 111 of the secondary battery 110 and the bus bar 221 from being damaged or prevent the internal components of the secondary battery 110 from being damaged.

Also, the stopper 235 may have a plate shape having left and right side surfaces 235a that are broader than upper and lower surfaces thereof. In addition, a guide protrusion 235P may be formed at the left side surface or the right side surface of the stopper 235 to guide the coolant introduced into the insert hole H1 (FIG. 6) of the bus bar frame 225 in an intended direction. Further, the guide protrusion 235P may be configured to distribute the coolant introduced into the insert hole H1 of the bus bar frame 225 (FIG. 6) of the bus bar assembly 220 in the upper and lower directions.

Specifically, the guide protrusion 235P may include a bar 235P1 extending in the front and rear direction and a bar 235P2 extending in the upper and lower direction, which are coupled to each other. That is, the guide protrusion 235P may have a 'T; shape lying down in a horizontal direction.

For example, as shown in FIG. 10, the 'T'-shaped guide protrusion 235P lying down in a horizontal direction may be formed at the right side surface 235a of each of the six stoppers 235 formed at the bus bar frame of the bus bar assembly 220. That is, since the guide protrusion 235P guides the coolant introduced from the outside to move in the upper and lower directions, the coolant may be guided to move to the upper end and the lower end of the accommodating portion 115 of the secondary battery 110 accommodated in the heat dissipation plate 130.

Thus, according to this configuration of the present disclosure, since the guide protrusion 235P may effectively guide the coolant introduced into the battery module 200 to the coolant moving portion 132, the coolant may move smoothly without stagnation, thereby effectively cooling the plurality of secondary batteries 110 of the battery module 200.

Referring to FIG. 6 again, the sensing circuit board 250 may have a connection hole H4 formed therein so as to be electrically connected to the plurality of bus bars 221. In addition, a connection protrusion 235P may be formed at one end of the bus bar 221 to be inserted into the connection hole H4 formed in the sensing circuit board 250.

For example, as shown in FIG. 6, the sensing circuit board 250 may be mounted to the lower side of the outer side surface of the bus bar assembly 220. In addition, a connection protrusion 235P for connecting to the connection hole H4 formed in the sensing circuit board 250 may be formed at the bottom of each of the four bus bars 221.

Further, a battery pack according to the present disclosure may include at least one battery module 200 according to the present disclosure. Also, the battery pack according to the present disclosure may further include, in addition to the battery module 200, a pack case for accommodating the battery module 200, and various devices for controlling charge and discharge of the battery module 200, for example a battery management system (BMS), a current sensor, a fuse and the like.

In addition, the battery pack according to the present disclosure may be applied to a device such as an energy storage system. In other words, the device according to the present disclosure may include the above battery pack.

Meanwhile, even though the terms indicating directions such as upper, lower, left, right, front and rear directions are used in the specification, it is obvious to those skilled in the art that these merely represent relative positions for convenience in explanation and may vary based on a position of an observer or an object.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

| Reference Signs | |
|---|---|
| 200: battery module | 100: cell assembly |
| 110: secondary battery | 115: accommodation portion |
| 130: heat dissipation plate | 131A: inlet portion |
| 131B: outlet portion | 132: coolant moving portion |
| 133: base plate | 135: sidewall |
| 136: corner portion | 136S: inclined surface |
| 136P: coupling protrusion | 136H: insert groove |
| 137: grip portion | 137T: support protrusion |
| 220: bus bar assembly | 221: bus bar |
| 225: bus bar frame | H1: insert hole |
| 230: end cover | 232: leaf spring |
| 234: honeycomb structure | 235: stopper |
| 235P: guide protrusion | H2: vent hole |
| 240: side plate | 250: sensing circuit board |

INDUSTRIAL APPLICABILITY

The present disclosure relates to a battery module and a battery pack including a plurality of battery modules. In addition, the battery module and the battery pack of the present disclosure are applicable to industries related to electronic devices, energy storage systems or vehicles.

What is claimed is:

1. A battery module, comprising:
a cell assembly having a plurality of secondary batteries arranged in a left and right direction;
a plurality of heat dissipation plates interposed between the plurality of secondary batteries, wherein at least a portion of a front end and a portion of a rear end of the heat dissipation plates are recessed to form an inlet portion and an outlet portion, respectively, so that a coolant is introduced from the outside or discharged to the outside, and wherein the heat dissipation plates have a coolant moving portion at which a moving space is formed so that the coolant moves to a front end, an upper end, a lower end and a rear end of the secondary batteries;
a bus bar assembly located at a front side or a rear side of the cell assembly and having a plurality of bus bars electrically connected to electrode leads respectively provided at the plurality of secondary batteries and a bus bar frame to which the bus bars are mounted, the bus bar frame having insert holes into which the electrode leads of the secondary batteries are inserted;
an end cover coupled to an outer side surface of the bus bar assembly and having a vent hole communicating with the coolant moving portion so that the coolant is introduced from the outside or discharged to the outside; and
a plurality of side plates configured to surround left and right side surfaces of the cell assembly, respectively.

2. The battery module according to claim 1, wherein the secondary battery includes:
an electrode assembly in which a positive electrode plate and a negative electrode plate are disposed with a separator being interposed therebetween; and
an exterior having an accommodation portion formed to accommodate and seal the electrode assembly along with an electrolyte and disposed to erect so that the accommodation portion is oriented to both sides,
wherein each heat dissipation plate includes:
a base plate provided to face one side surface of the secondary battery at which the accommodation portion is formed; and
sidewalls extending from an outer edge of the base plate toward the secondary battery to surround a front end, an upper end, a lower end and a rear end of the secondary battery,
wherein the coolant moving portion is formed in a space between the front end, the upper end, the lower end and the rear end of accommodation portion and the sidewalls of the heat dissipation plate.

3. The battery module according to claim 2, wherein the sidewalls of the heat dissipation plate include a front sidewall, a rear sidewall, an upper sidewall and a lower sidewall,
wherein corner portions ridged toward arrangement of the plurality of secondary batteries are formed at upper and lower portions of an inner surface of the front sidewall or the rear sidewall, and
wherein the corner portion has an inclined surface extending from the front sidewall or the rear sidewall to the upper sidewall or the lower sidewall.

4. The battery module according to claim 3, wherein a coupling protrusion protruding toward another heat dissipation plate is formed at the corner portion, and
wherein an insert groove is formed at the heat dissipation plate so that a coupling protrusion formed at another heat dissipation plate is inserted therein.

5. The battery module according to claim 3, wherein a grip portion extending with a slant from the base plate is formed at the sidewall of the heat dissipation plate to adhere and support an outer surface of the secondary battery.

6. The battery module according to claim 5, wherein at least two support protrusions protruding upward or downward are formed at the grip portion to support and fix an inner surface of the upper sidewall or the lower sidewall of the side plate.

7. The battery module according to claim 1, wherein the electrode leads are inserted into the insert holes of the bus bar frame and is in contact with the bus bar when an end of each of the electrode leads is bent in a left direction or in a right direction.

8. The battery module according to claim 7, wherein a leaf spring is mounted to an inner side surface of the end cover to press an end of the electrode leads in contact with the bus bar toward the bus bar frame.

9. The battery module according to claim 8, wherein at least a portion of a surface of the end cover, which is opposite to the surface to which the leaf spring is mounted, has a honeycomb structure.

10. The battery module according to claim 7, wherein a stopper protruding toward accommodation portion of the secondary battery is formed at the bus bar frame to prevent the secondary battery from moving forward or rearward.

11. The battery module according to claim 10, wherein the stopper has a plate shape whose left and right side surfaces are broader than upper and lower surfaces thereof, and
wherein a guide protrusion is formed at a left side surface or a right side surface of the stopper so that the coolant introduced into the insert holes is distributed in an upper and lower direction.

12. A battery module, comprising:

a cell assembly having a plurality of secondary batteries arranged in a left and right direction;

a plurality of heat dissipation plates interposed between the plurality of secondary batteries, wherein the plurality of heat dissipation plates have an inlet portion and an outlet portion recessed so that a coolant is introduced from the outside or discharged to the outside, and the heat dissipation plates have a coolant moving portion at which a moving space is formed so that the coolant moves to a front end, an upper end, a lower end and a rear end of the secondary batteries;

a bus bar assembly located at a front side or a rear side of the cell assembly and having a plurality of bus bars electrically connected to electrode leads respectively provided at the plurality of secondary batteries;

a bus bar frame to which the bus bars are mounted, the bus bar frame having insert holes into which the electrode leads of the secondary batteries are inserted;

a sensing circuit board mounted to the bus bar frame and electrically connected to the plurality of bus bars;

an end cover coupled to one surface of the bus bar assembly and having a vent hole communicating with the coolant moving portion so that the coolant is introduced from the outside or discharged to the outside; and a plurality of side plates configured to surround both left and right side surfaces of the cell assembly, respectively.

13. A battery pack, comprising at least one battery module according to claim 1.

14. A device, comprising the battery pack according to claim 13.

* * * * *